Dec. 12, 1967 K. P. LALLY 3,358,185
GATED ELECTROLUMINESCENT DISPLAY DEVICE HAVING
A PLURALITY OF ELECTROLUMINESCENT CELLS WITH
ONE CELL INCLUDING A PHOTOCONDUCTOR ELEMENT
Filed Aug. 20, 1965 5 Sheets-Sheet 1

INVENTOR.
KENNETH P. LALLY
BY [signature]

Dec. 12, 1967 K. P. LALLY 3,358,185

GATED ELECTROLUMINESCENT DISPLAY DEVICE HAVING
A PLURALITY OF ELECTROLUMINESCENT CELLS WITH
ONE CELL INCLUDING A PHOTOCONDUCTOR ELEMENT

Filed Aug. 20, 1965 5 Sheets-Sheet 2

INVENTOR.
KENNETH P. LALLY
BY [signature]

INVENTOR.
KENNETH P. LALLY
BY [signature]

Dec. 12, 1967 K. P. LALLY 3,358,185

GATED ELECTROLUMINESCENT DISPLAY DEVICE HAVING A PLURALITY OF ELECTROLUMINESCENT CELLS WITH ONE CELL INCLUDING A PHOTOCONDUCTOR ELEMENT

Filed Aug. 20, 1965 5 Sheets-Sheet 4

INVENTOR
KENNETH P. LALLY
BY William S. Rlumis

INVENTOR.
KENNETH P. LALLY
BY [signature]

United States Patent Office 3,358,185

Patented Dec. 12, 1967

3,358,185

GATED ELECTROLUMINESCENT DISPLAY DEVICE HAVING A PLURALITY OF ELECTROLUMINESCENT CELLS WITH ONE CELL INCLUDNG A PHOTOCONDUCTOR ELEMENT

Kenneth P. Lally, Smithtown, N.Y., assignor, by mesne assignments, to Hartman-Huyck Systems Co., Inc., Columbus, Ohio, a corporation of Ohio Filed Aug. 20, 1965, Ser. No. 481,360
20 Claims. (Cl. 315—167)

ABSTRACT OF THE DISCLOSURE

An electroluminescent display device is provided which includes at least two electroluminescent cell structures which are independently responsive to the application of a respective signal to each cell with at least one cell also being provided with a layer of photoconductive material in addition to the layer of electroluminescent material. The photoconductive material layer in the one cell is optically coupled with the electroluminescent material layer in the other cell and is designed to prevent luminescing of the electroluminescent material in the cell in which it is included unless impinged by light from the other cell and thereby effect a decrease in the impedance thereof even though a signal may be applied to this cell. Thus, the electroluminescent display device incorporates a gating function requiring the simultaneous application of a respective signal to each electroluminescent cell in order to obtain a display output. The electrodes for applying the signals to the respective cells are formed to provide an analog display with the application of digital input signals.

In my copending patent application, Ser. No. 409,639, filled Nov. 9, 1964, entitled "Apparatus of Electroluminescent Display Device," I taught how it is possible to achieve all of the advantages which are inherent in electroluminescent devices generally and, at the same time, to achieve other highly desirable objects, including reduction in the amount and complexity of the associated circuitry, and making digital or incremental to analog conversions without the use of separate converter units as added circuit elements. The invention which that application taught also greatly expands the logic or number handling capabilities of electroluminescent display devices from the previous limits of first order ("N" exponent) inputs to second order (exponents of $N+1$) inputs as well. I taught how these things might be done through a unique combination of electrode groupings and interconnections.

It is an object of the present invention to permit construction of electroluminescent devices which can accommodate inputs of any exponential order to any base number. It is a further object to do so in such a fashion as to produce an output representation which is unique for each combination of inputs.

Still another object of this invention is to permit construction of devices which can be made to function as base number converters.

Another object of this invention is to permit the construction of devices suitable for producing analog displays of digital inputs without the necessity of having digital to analog converters in circuit elements. It is a further object to do so for inputs of any exponential order for any base number.

It is still another object of this invention to permit construction of devices suitable for resolving multi-axial inputs, without limitation to their exponential orders or the base number of the inputs.

Another object of this invention is to permit construction of devices suitable for determining analog sums by the vectorial addition of digital inputs of any magnitude and to any base.

Still another object of this invention is to permit construction of unique matrix decoder devices.

Yet another object of this invention is to permit construction of unique memory devices.

Figure 1:
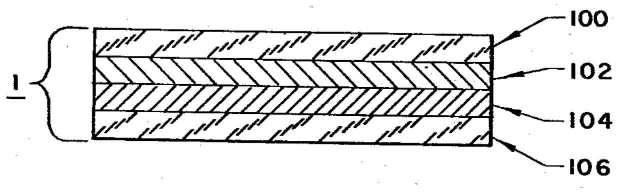
Figure 2:
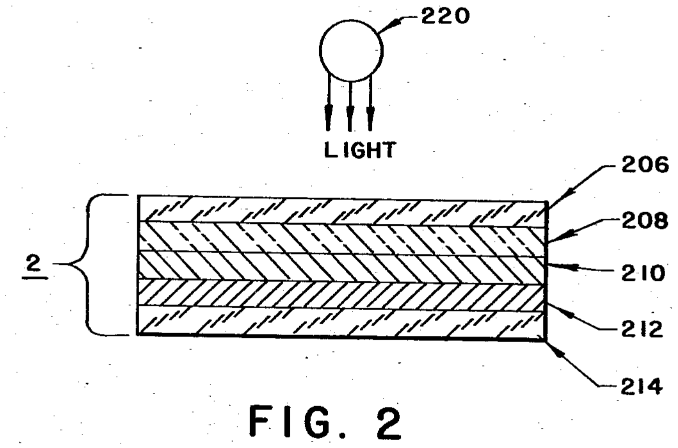
Figure 3:
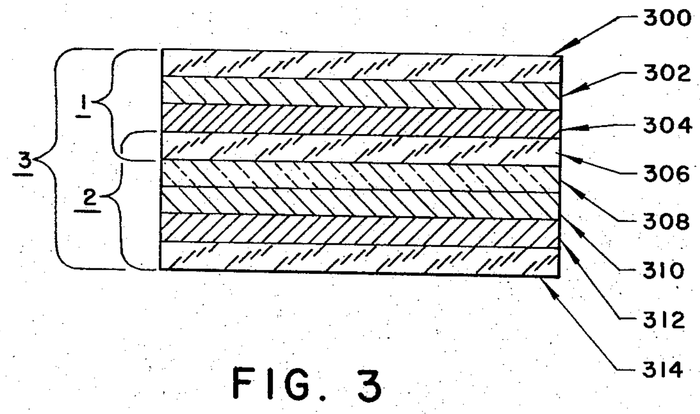
Figure 4:
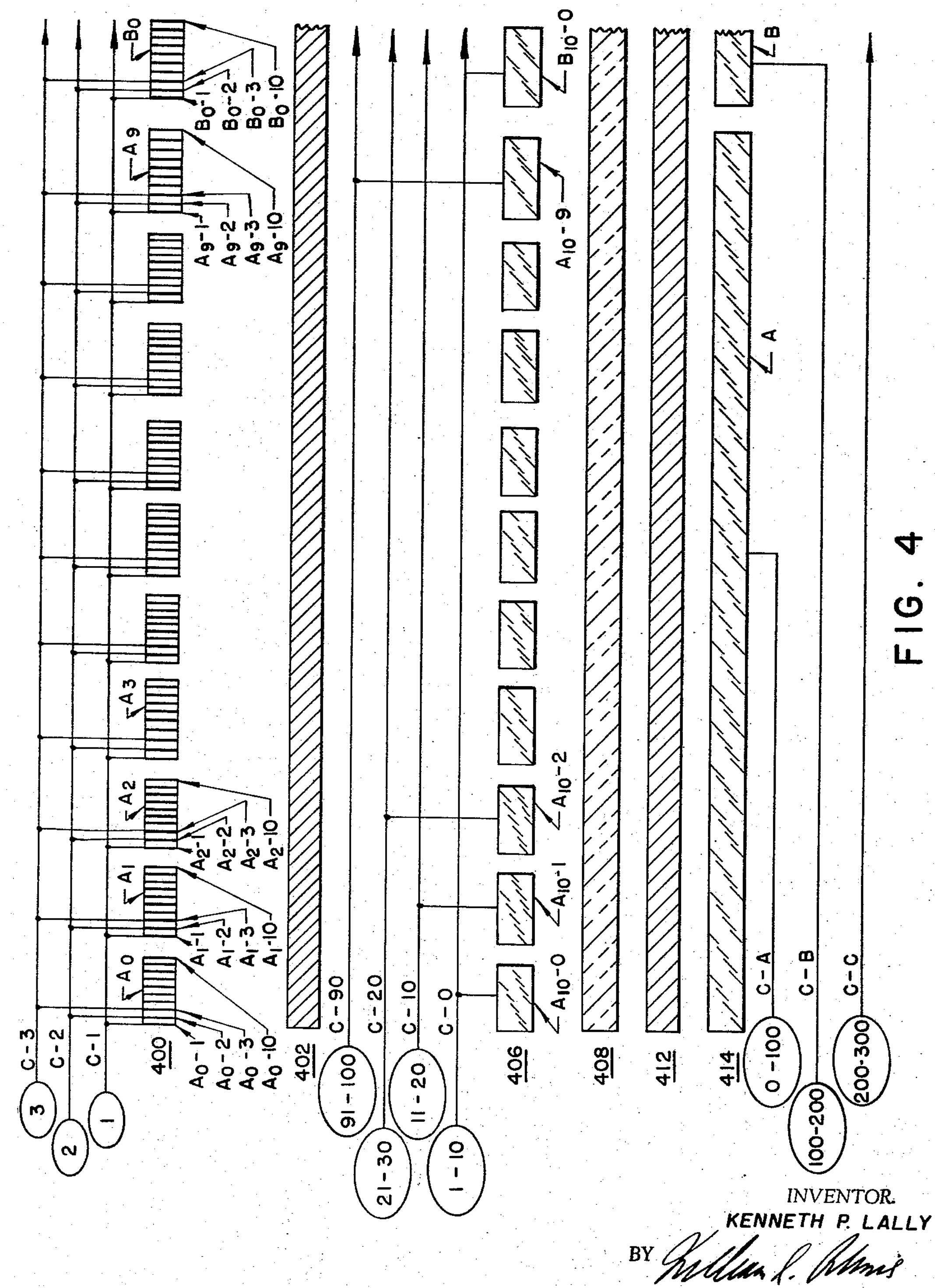
Figures 5A, 5B:
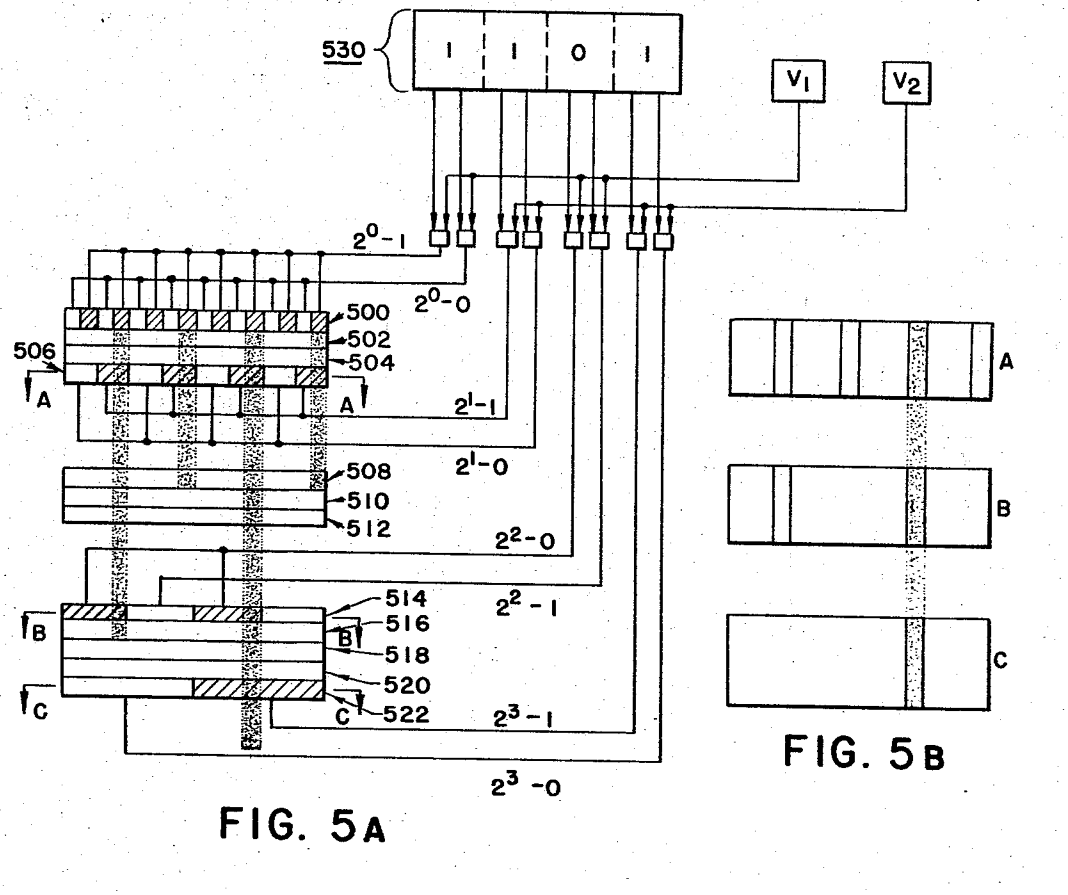
Figure 5C:
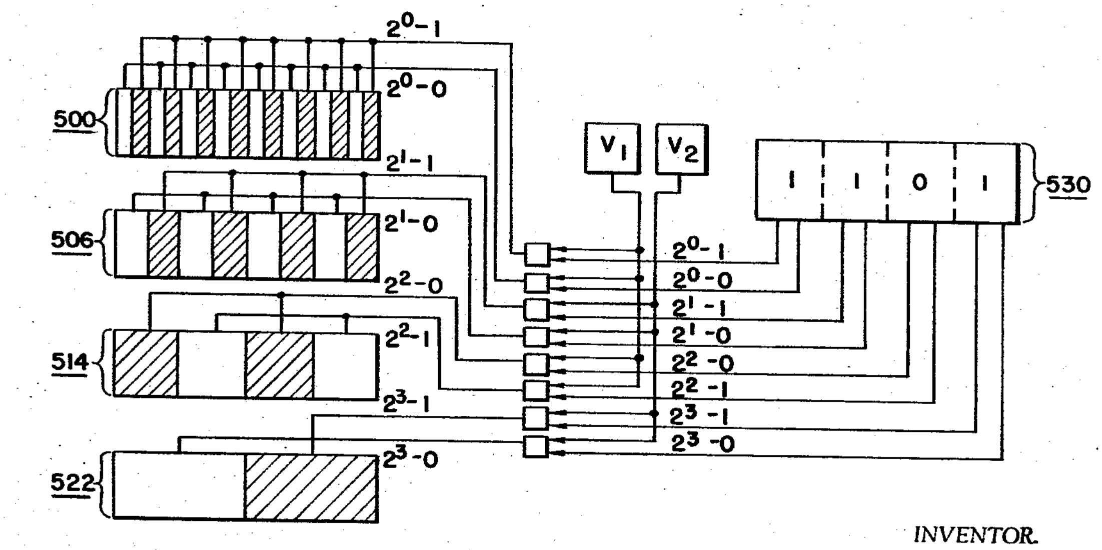
Figure 6:
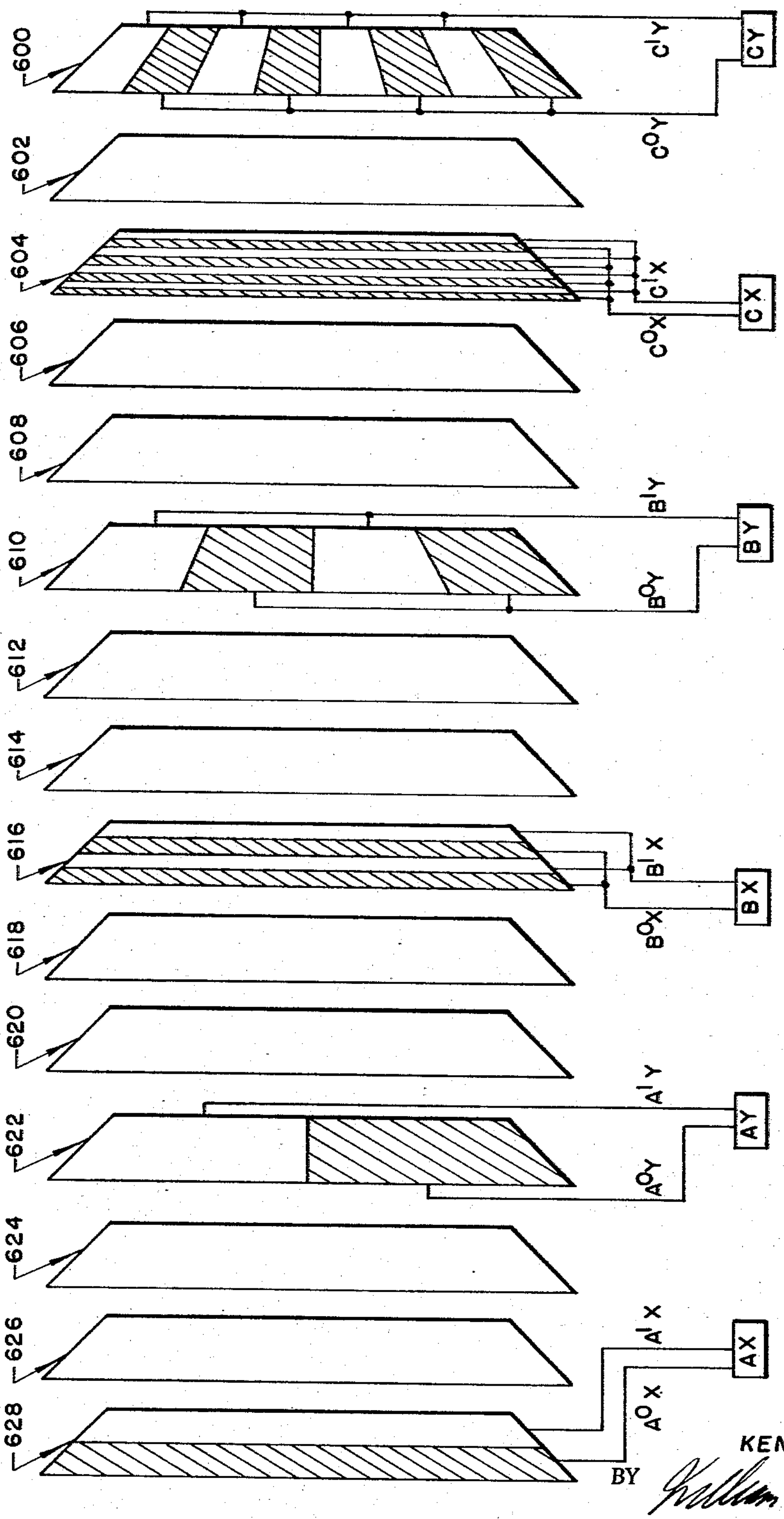
Figure 7:
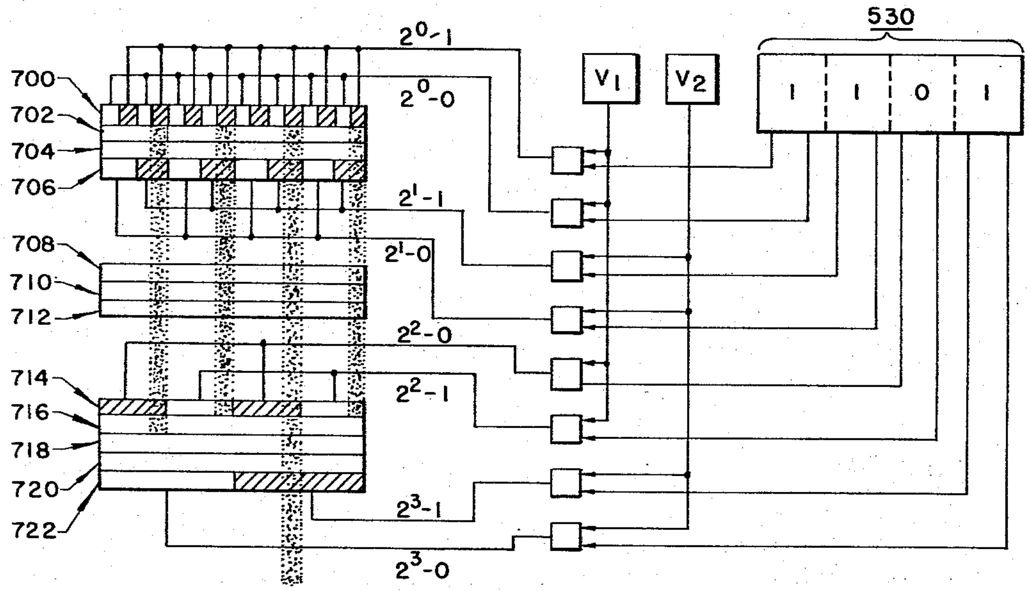
Figure 8:
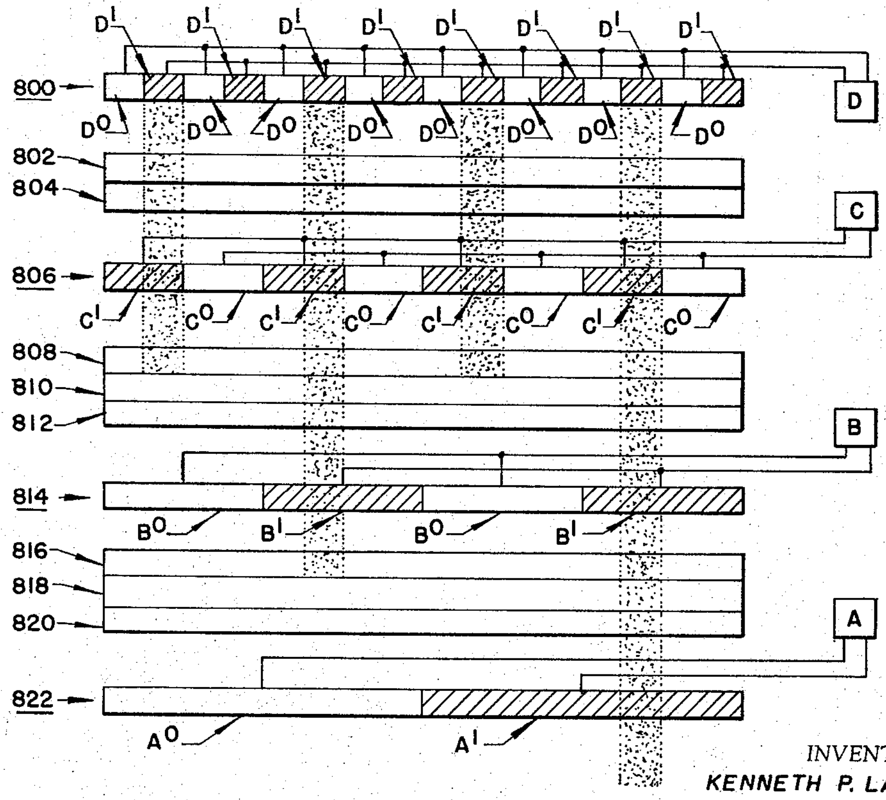

That these and a wide variety of other objects which will be readily apparent to those skilled in the art may be achieved through practice of this invention, will be apparent from the discussion which follows and from the attached drawings, of which FIGURE 1 is a cross sectional view of one type of electroluminescent device, FIGURE 2 is a cross sectional view of another type of electroluminescent device, FIGURE 3 is a cross sectional view of a third type of electroluminescent device, FIGURE 4 is an expanded plan view of the structure and circuitry of one embodiment of this invention, FIGURE 5A is an expanded plan view of another embodiment of this invention, FIGURE 5B is a composite of cross-sectional side views of the embodiment of this invention shown in FIGURE 5A through the planes A—A′, B—B′, and C—C′, FIGURE 5C is a composite of cross-sectional side views of the electrode layers in the embodiment of this invention shown in FIGURE 5A, FIGURE 6 is an expanded plan view of another embodiment of this invention, FIGURE 7 is an expanded plan view of yet another embodiment of this invention, and FIGURE 8 is an expanded plan view of still another embodiment of this invention.

Referring first to FIG. 1, it will be seen that a typical electroluminescent unit 1 of well-known design comprises an electrode layer 100, and an opposing electrode layer 106, with an electroluminescent layer 104 interposed therebetween. Either or both of the electrode layers 100, 106 may be transparent or at least translucent, but at least one of these should be light transmissive if the light output of the electroluminescent material to be observed. Such electrodes may be produced by well-known techniques, as by depositing tin oxide on a clear substrate such as glass. Similarly, the electroluminescent layer may be made from zinc sulfide doped with small amounts of copper and chlorine as activating agents, which may then be incorporated into a dielectric bonder such as epoxy or cyanoethyl cellulose. In addition to the electroluminescent layer 104, there may be disposed next to it, and between it and one of the electrodes 100, 106, a non-linear resistive layer 102 of well-known composition which has, as its function, to heighten the intensity of the output of a selected area as compared to that of adjacent areas, which are not excited by as high as electrical potential. Such a layer, while offering distinct and well-recognized advantages in the operation of most units of this design, is not a critical element in the practice of this invention. Such layers may be formed from silicon carbide, or cadmium sulphide, in suitable binder material.

FIG. 2 illustrates structural features of another electroluminescent device. Depicted therein is an electroluminescent unit 2 comprising upper and lower electrode layers 206, 214 which compare in position, design and function to the electrodes 100, 106 shown in FIG. 1. Similarly, an electroluminescent layer 212 and an optional layer 210 of non-linearly resistive material, comparable to those shown in FIG. 1, are shown as having been interposed between the electrodes 206, 214. However, in the electroluminescent unit shown in FIG. 2, there is also a photoconductive layer 208 interposed between the non-linearly resistive layer 210 and the upper electrode 206. This photoconductive layer may be made of any one or a combination of a number of materials, such as suitably activated cadmium sulfide or cadmium selenide, which have the characteristic or reducing their electrical impedance when subjected to radiant energy excitation. Optionally, impedance matching electrodes (not shown) may be used to eliminate variations in potential caused by nonuniform conducting paths through the various layers positioned between the electrode layers. Such impedance matching electrodes set up planes of equal potential, and may be positioned between the photoconductive and non-linear resistance layers, or between the non-linear resistance layer and the electroluminescent layer, although their use is not essential to practicing this invention.

Assume, for purposes of illustration, that sufficient electrical energy is applied to both electrodes, 206, 214 from a voltage source (not shown) to cause the electroluminescent layer 212 to glow but for the additional inter-electrode impedance attributable to the unactivated photoconductive layer 208. If light from an outside source 220 is permitted to traverse the translucent electrode 206 and to impinge upon the photoconductive layer 208, the inter-electrode impedance can be reduced to a level such that the electrical energy applied to the electrodes 206, 214 exceeds the illumination threshold set up by the electroluminescent layer and the non-linearly resistive layer in combination, and, as long as the light energy is received by the photoconductive layer 208, the electroluminescent layer 212 will be caused to glow.

FIGURE 3 illustrates the effect which may be achieved by "piling" the unit 1 illustrated in FIG. 1 on unit 2 illustrated in FIG. 2 to form a unique structure 3. This structure comprises an upper electrode 300, a non-linearly resistive layer 302, an electroluminescent layer 304, a translucent electrode layer 306, a photoconductive layer 308, a second non-linearly resistive layer 310, a second electroluminescent layer 312, and a translucent electrode 314. In this structure, if the electrical potential between the electrode 300 and the electrode layer 306 is insufficient to cause the electroluminescent layer 304 to emit light, the electroluminescent layer 312 will not be caused to glow even if the electrodes 306, 314 are energized but at a level lower than that necessary to exceed the illumination threshold of the electroluminescent layer 312. If, however, the electrical potential between the electrode 300 and the electrode 306 is sufficient to exceed the illumination threshold of the electroluminescent layer 304, that electroluminescent layer will be caused to glow and the light emitted from it, which traverses downward through the structure and impinges upon the photoconductive layer 308, will cause the inter-electrode impedance between the electrodes 306, 314 to be reduced and the electroluminescent layer 312 will be caused to glow and emit light. Thus, it will be seen that through utilization of the principles embodied in this unique structure, the response of the lower electroluminescent layer 312 can be made to depend upon the electrical energy supplied to electrodes 306, 314, and, in addition, the extent of excitation of the electroluminescent layer 304 which, in turn is dependent upon the electrical energy input to electrodes 300 and 306. Thus, one response can be made to depend upon a unique combination of two sets of inputs.

It will be obvious that this teaching can be carried out without limit so as to make one response dependent upon any number of inputs. For example, third and fourth units of the type illustrated in FIG. 2 might be added to the bottom of the unit illustrated in FIG. 3, which would produce a unit in which the fourth, or bottom-most, electroluminescent layer will be caused to glow provided two conditions are satisfied (1) the electrodes bracketing it are energized sufficiently to bring it above the illumination threshold but for the added impedance of the photoconductive layer positioned next to it, and (2) radiant energy is impinging upon that photoconductive layer as output of the electroluminescent layer in the third unit, which is the one next preceding the lowest electroluminescent layer in the unit. In such a multiple unit that next preceding or third unit electroluminescent layer will, of course, emit only upon satisfaction of the same conditions with respect to energization of its bracketing electrodes and light impingement on its associated photoconductive layer. Thus it will be seen that a unit having a total of four electroluminescent layers can be made to require that four separate and distinct input signals be applied simultaneously in order to produce a single output.

This unique gating principle may be utilized in a variety of ways. For example, it may be combined with unique circuitry to produce indicator devices suitable for displaying any power of any base number. This will now be demonstrated, referring to FIG. 4, wherein is depicted an embodiment utilizing the principles of this invention which is suitable for handling inputs of any number from the "N" power through the "$N+2$" power of the base number 10.

The embodiment illustrated in FIG. 4 comprises a first electrode layer 400 having groups of electrically discrete electrodes in groups A0, A1, A2, . . . A9, B0 . . . etc., each group respectively comprising electrodes A0–1, A0–3 . . . A0–10; A1–1, A1–2, A1–3 . . . A1–A10; A2–1, A2–3 . . . A2–10; A9–1, A9–2, A9–3 . . . A9–10; B0–1, B0–2, B0–3 . . . B0–10; . . . etc. Each of the electrodes in each group is electrically common with that electrode in every other group which occupies the same sequentially corresponding position as it does with respect to the remaining electrodes in its respective group. Thus, electodes A0–1, A1–1, A2–1 . . . A9–1, B0–1 . . . etc. are all connected to energizing circuit C–1. Similarly, electrodes A0–2, A1–2, A2–2 . . . A9–2, B0–2 . . . etc. are all connected to energizing circuit C–2, and so forth.

Immediately adjacent to the electrode layer 400 is an electroluminescent layer 402 which is continuous and corresponds in nature and function to the electroluminescent layer 304 previously described in connection with FIG. 3.

In FIG. 4, the non-linearly resistive layers and impedance matching electrodes previously described have not been shown in order to facilitate this description, since they are not essential to practicing this invention. Therefore, there is shown next to the electroluminescent layer 402, a second electrode layer 406. This layer includes electrically discrete translucent electrodes of the type heretofore described, each of which is coextensive with one of the electrode groups (of 10 electrodes) in the first electrode layer 400 and positioned on the opposite side of the electroluminescent layer 402 therefrom, and is electrically connected to every 10th electrode in the same electrode layer 406. Thus electrodes A10–0, B10–0, C10–0 (not shown) . . . etc. are all energized by Circuit C–0; electrodes A10–1, B10–1 (not shown) . . . etc. by Circuit C–10, and so forth. Immediately next to the second electrode layer 406 is a layer of photoconductive material 408, and next to it a second layer of electroluminescent material 412, both of which may also be of the types heretofore described. Finally, there is a third electrode layer 414 composed of translucent electrodes A, B . . . etc. each of which is electrically discrete from the other electrodes in the same layer and is coextensive with 10 of the electrodes forming the second electrode layer 406 (e.g. electrode A is coextensive with electrodes A10–0 through A10–9), on the opposite side of the photoconductive and electroluminescent layers (408, 412) therefrom. Each of the electrodes in the layer 414 delineates which may be referred to as one unit of the whole display. Any number of such units can comprise the whole display, but 10 (or a multiple of 10) would be the most likely number to be used in accommodating values to the base number 10.

In operation, the circuits C–1, C–2, C–3 . . . etc. which energize the electrodes of the groups forming the 1st electrode layer 400, are energized in sequence by means of a first order input discriminating device, such as a digit counter. In the example being discussed, the base number being treated is 10, so the output of this counter would correspond to $1\times10^0$ (or 1), $2\times10^0$ (or 2), $3\times10^0$ (or 3) . . . etc. The circuits C–0, C–10, C–20 . . . etc. which energize the electrodes of the second electrode layer 406 are energized in sequence by means of a second order input discriminating device, which, in this example of base 10 numbers, would correspond to $0\times10^1$ (or 0), $1\times10^1$ (or 10), $2\times10^1$ (or 20), . . . etc. The electrodes A, B . . . etc., forming the third electrode layer 414 are similarly sequentially energized by means of a third order input discriminating device whose outputs, in this case, would correspond to $0\times10^2$ (or 0), $1\times10^2$ (or 100), . . . etc.

Let us assume, for purposes of illustration, that an input of 093 is to be displayed. The first order or "units" input value of 3, or $3\times10^0$, will be converted into an input by energization of circuit C–3, which will cause every third electrode (A0–3, A1–3, A2–3 . . . A9–3, B1–3 . . . etc.) in electrode layer 400 to be energized.

The second order or "tens" input value of 90, or $9\times10^1$ will result in energization of circuit C–90 which, in turn will cause electrode A10–9 and only every 10th electrode in sequence thereafter in the second electrode layer 406 to be energized. The third order or "hundreds" input value being 0, (or in the base 10 system $0\times10^2$, electrode A alone out of all of the electrodes comprising the electrode layer 414 will be energized.

The electroluminescent material in electroluminescent layer 402 will luminesce only where interposed between energized electrodes; in this case between electrodes A9–3 and A10–9, as well as every other set of opposing electrodes occupying sequentially comparable positions in the rest of the units forming the whole display. The light emitted from the electroluminescent layer 402 as a result of this excitation will traverse the translucent electrode layer 406 and impinge upon the photoconductive layer 408, causing the impedance between the electrode A10–9 and electrode A to reduce sufficiently to permit those electrodes to cause the electroluminescent layer 412 to luminesce at the point and in the configuration of light impingement. And even though, as previously noted, the electroluminescent layer 402 is being caused to luminesce at other points, only that light pattern originating between and coincident with electrodes A9–10 and A10–9 will appear upon viewing the layer 414 of the whole display, since only electrode A, but none of the others (B, C (not shown) . . . etc.) in the same electrode layer 414, are energized. Thus, only at one position in the whole display are the two conditions necessary for regenerative luminescence in the electroluminescent layer 412 satisfied, i.e. excitation by energized bracketing electrodes, and inter-electrode impedance reduced below the illumination threshold. Thus, it will be seen that the position of the observed response can be made to be unique for this one combination of inputs. A response in this one position will not occur as a result of any other input combination, and this particular input combination will not produce a response at any other position in the display.

It will be apparent that, utilizing the principles of this invention as demonstrated in the foregoing description of this embodiment, it is possible to accommodate numbers of any power to any base. The base number chosen may be expressed as the ratio of the number of electrodes in a given layer to that in the layer immediately preceding it in the light impingement sequence. Thus, in this case, one electrode in layer 414 was made coextensive with ten electrodes in layer 406, and each electrode in layer 406 was made coextensive with ten electrodes in layer 400 which are, of course, zero, 1st, and 2nd power relationships respectively to the base 10. Similarly, a 1–7–49 overlay relationship for numbers to the base 7 could be constructed, or 1–3–9 for numbers to the base 3, etc. It should be clearly understood, however, that this is not to say that the same overlay ratio must be preserved from layer to layer, for it might be desirable in some applications to vary these ratios from layer to layer. Thus, a layer to layer ratio of 1–3–21 in each grouping would permit accommodation of 2 orders of base 3 numbers and one of base 7 numbers. By this technique, a uniquely positioned output may be distinctly related to a given combination of inputs regardless of their number bases. The powers of the chosen base number which can be accommodated may be related to the number of electrode layers in the display where each successive layer preserves the overlay ratio to the layer next preceding it, or a multiple thereof. Thus in the embodiment which was discussed as illustrated in FIG. 4, 3 electrode layers of an overlay ratio of 10 were given, so inputs of 3 consecutive powers of the base 10 can be accommodated. In the example given, the primary input is of first order (or zero power) numbers, so the inputs to the second and third electrode layers, each of which was in a 10 to 1 overlay ratio to the layer next preceding it in the excitation order, are to the 1st and 2nd power respectively of the base 10. It will be apparent that an infinite number of such layers could be added, so as to accommodate any power of the base in question since light regeneration takes place in each successive electroluminescent layer. It is also apparent that the primary input need not necessarily be to the zero power but can be to any power, and the sequence of the powers represented by the other layers will be sequentially the same relative to it, each merely being adjusted consistently with the power of the primary input. Regardless of the exponential relationship, the relative input handling capacity of the several layers is preserved.

It is also clear that the power relationships which this invention is capable of accommodating are not limited to powers sequentially in arithmetic series, (e.g., $X^0$, $X^1$, $X^2$ . . . $X^n$, or $X^{0x3}$, $X^{1x3}$, $X^{2x3}$, $X^{3x3}$, . . . $X^{nx3}$). Thus, by appropriately adjusting the overlay ratios, irregular power sequences may be accommodated. For example, using the embodiment heretofore described and illustrated in FIG. 4 in the example discussed, if each electrode forming the second electrode layer 406 overlays 1 group of 10 electrode layers each in the electrode layer 400, and each electrode in layer 414 overlays 100 electrodes in the layer 406, the unit will be so constructed as to handle the following sequence of powers; $X^0$ or digits in layer 400, $X^1$ or tens in layer 406, but $X^3$ or thousands in layer 414.

It is also apparent that, through use of this invention, the selected power sequence to the chosen base may be made to produce a positional display in sequential steps within a group and from group to group, or with the consecutive order of display varied regularly or irregularly in any order, and still preserve the distinctive characteristics of having the position of display unique to each combination of inputs.

It is apparent, too, that by juxtaposing a reference, such as a scale or dial, next to the read out display, analog interpretations of digital inputs may be made without the necessity of complex digital to analog converters as circuit elements. In this respect, devices utilizing the principles of this invention are themselves digital to analog converters, again, with the unique ability to accommodate any sequence of orders of powers to any base number. It should be noted that this conversion is achieved without the presence of a separate convertor unit as a constituent of the device, thereby avoiding the objectionable features of such a unit, such as power consumption, bulk, weight and additional circuits.

It should also be noted that the circuitry associated with the disclosed device is significantly less complex than that of devices suitable for achieving comparable results, whether as signal displays, as digital to analog converters, or for any of the other applications described herein. For example, the embodiment illustrated in FIG. 4 and previously described is capable of displaying $10^3$ or 1000 outputs through utilization of $3\times10$ or 30 circuits, and does so while still attaining all of the advantageous features of electroluminescent display devices which, not utilizing the principles of this invention, have heretofore required as many as 1001 inputs to achieve comparable results. Furthermore, it will be apparent that geometric increases in the number accommodation capability of a given unit may be achieved with only arithmetic increases in circuitry and structure. Thus, in the embodiment discussed, two additional layers will make it possible to accommodate $10^5$ or 100,000 inputs with only $5\times10$ or 50 circuits.

It will be apparent that the teachings of this invention are not to be limited by the descriptions of the particular embodiments set forth herein. Thus, for example, the inter-electrode voltage sensitivity might be varied as desired as between the electrodes bracketing a given layer of electroluminescent material by varying the thickness of such material between given sets of bracketing electrodes. This might be done as a uniform gradient of increase looking in either direction across all of the electrodes along a given layer. On the other hand, such a gradient might be usefully employed with respect to the long axes of rectangular electrodes forming part of a bracketing set, with respect to the opposing electrodes in the same set. Instead of a uniform gradient from set to set of electrodes, it might even be desired to so vary the electrical sensitivity in some irregular set-to-set fashion. Also, electrode sizes within a given electrode plane may be varied, as desired according to any regular or irregular mathematical function, such as sinusoidal or logarithmic, arithmetic or geometric, or in pseudo-random fashion, as long as bracketing sets of electrodes maintain some coextensive relationship to each other, although constant areas of coextensivity from set-to-set need not be maintained.

Further, even though the embodiments illustrated herein are shown as having flat or planar electrode arrays and intermediate layers, it is apparent that these elements could actually be of a wide variety of geometric shapes, such as cylinders, concentric circles, regularly or irregularly curved sheets, etc., so long as the desired spacial relationships of the constituent elements with respect to each other are preserved according to the teachings of this invention.

It should also be clear that the exact order of constituents might be reversed. Thus, the electrode array having the greatest number of electrodes has been shown in the rearmost position in the structure. The sequence of electrode arrays could be reversed and the device would be as effective in the practice of the teachings of this invention, provided the masses of electroluminescent and photoconductive materials are positioned between the electrode arrays in a manner consistent with the teachings set forth herein, and provided further that the electrodes comprising the front or viewing surface, as well as the intermediate electrodes, regardless of their number, are light transmissive. In either case, it will be apparent that each electrode in each electrode array other than the array having the greatest number of electrodes will be coextensive with at least a portion of more than one electrode in an electrode array next adjacent to it. As used here, and in the rest of this application, including the claims, the term "coextensive" means that the elements so described are so positioned with respect to each other that a straight line projection of at least a portion of one of them onto the other along a path described by a line drawn perpendicular to a plane positioned halfway between the median plane of each element will circumscribe at least a portion of the other. In embodiments, such as that illustrated in FIGURE 4, where the electrode elements are in planar array with the planes of such arrays parallel to each other, the line of such a projection obviously will be perpendicular to the planes of all the elements. In a case where the elements are not in planar array, the same criterion will apply to differential elements thereof.

FIGS. 5A, 5B and 5C illustrate another embodiment of this invention. Discussion of this embodiment is useful to demonstrate some of the other objectives which may be realized through practice of the principles of this invention.

Shown in FIG. 5A is a plan view of this embodiment, in which the constituent groupings have been separated for the purpose of illustrating the associated circuitry. FIG. 5C is another illustration of the same embodiment showing only the electrode layers in side view, separated from and positioned with respect to each other so as to facilitate illustration of the electrodes and their associated circuitry.

Shown in FIGS. 5A and 5C is an electroluminescent device similar in structure to that which has been illustrated in FIG. 4 and previously discussed. This embodiment comprises a first electrode layer 500, a first non-linearly resistive layer 502, a 1st electroluminescent layer 504, a second electrode layer 506, a first photoconductive layer 508, a second non-linearly resistive layer 510, a second electroluminescent layer 512, a 3rd electrode layer 514, a second photoconductive layer 516, a third non-linearly resistive layer 518, a 3rd electroluminescent layer 520, and a fourth electrode layer 522. The nature and function of each of these layers is substantially the same as comparable components which have previously been discussed in connection with the embodiment shown in FIG. 4. In this embodiment, however, the overlay ratio of sequential electrodes in the light impingement series is 2 to 1. Thus, in view of the discussion set forth in connection with the embodiment shown in FIG. 4, it will be apparent that the embodiment shown in FIGS. 5A and 5C is sutiable for accomodating inputs in the order of 4 consecutive powers of the base number 2. Accordingly, a binary digital input set 350 capable of generating 4 bits of input may be interconnected with power supplies V1 and V2 in such a fashion that either of two circuits associated with each bit in the set may be alternatively energized. By means of such separate power sources (AC or DC), suitable potential differences may be erected across intermediate layers of electroluminescent material to cause them to glow when both bracketing electrodes are energized, but not when only one is energized. When DC phosphors are used, V1 and V2 will normally be voltage sources at different levels of potential. When AC phosphors are used, V1 and V2 may be alternating potential sources suitably out of phase to create an adequate potential difference between them. Of course, V1 and V2 may also be the two terminals of a single voltage source. In a base 2 system, the bits as displayed would correspond (reading from left to right) to $2^0$, $2^1$, $2^2$, and $2^3$ respectively, and each bit may be in either a "go" (1) or "no-go" (0) attitude Thus, bit $2^0$, when in a "go" attitude displays the logic 1 and circuit $2^0$–1 and every other electrode in the 1st electrode layer 500, which are electrically connected to the circuit $2^0$–1, are energized. On the other hand if the same bit displays logic 0, the circuit $2^0$–0 and the other electrodes forming the layer 500 which are associated therewith will be energized. Similarly, each sequential bit in the set 530 will energize one of two associated circuits, each of which will energize one half of the electrodes sequentially in the electrode layers 506, 514 and 522. Assume, for purposes of illustration, that the bits comprising the set display 1101. Through energization of these associated circuits, alternate electrodes in each of the electrode layers 500, 506, 514 and 522 (which have been shaded for purposes of illustration in FIGS. 5A and 5C) will be energized, and that electroluminescent material which is positioned between energized electrodes will be caused to glow, provided the inter-electrode impedance is below the illumination threshold. In the case of electroluminescent layers 512 and 520, this will only occur if and to the extent that their respectively associated photoconductive layers 508 and 516 are impinged upon by light originating from those electroluminescent layers which precede them respectively in the light impingement sequence in the pile. The resulting light patterns, as seen along planes A—A, B—B and C—C in FIG. 5A, are illustrated in FIG. 5B.

The decimal equivalent of the binary input 1101 (left to right sequence) is $$(2^0\times 1)+(2^1\times 1)+(2^2\times 0)+(2^3\times 1)$$

which, in the decimal system, is 11, and it will be noted that in the embodiment illustrated in FIGS. 5A and 5C this input energizes electrodes such that, viewing electrode plane 522, a line of light will be caused to appear in the 11th incremental position from the left. Additional sequential digital inputs will cause the exhibited light to migrate in sequential step motion from left to right.

The sequence of movement could, of course, be varied in a number of different ways, such as from right to left, or in some regular intermittent pattern, or even in some irregular pattern. It also should be noted that the embodiment illustrated in FIGS. 5A and 5C, like that illustrated in FIG. 4, can be made so as to provide analog read-outs for digital inputs without the necessity of having a digital-to-analog convertor as an additional circuit constituent by positioning its output display next to some continuum of reference.

It should also be emphasized that in addition to being a structure useful for such display of numbers to the base 2, the embodiment shown in FIGS. 5A and 5C also demonstrates how the principles of this invention may be used as a base number convertor as well. Thus, in the discussion which has been set forth in connection with these figures, the input was binary, but it was shown that the output is readily interpreted in decimal values. Obviously, however, the output might have been interpreted to any other base number as well.

It should also be noted that any read out of devices made in accordance with this invention could be purely visual or might even be automated, for example, by positioning a series of light responsive units at the successive read out positions with the outputs of such units registering incrementally or directly in the symbolism of the chosen base.

It will also be apparent from FIG. 6, that through use of the principles of this invention, it is possible to accommodate more than one quality of inputs for each order of input. In the embodiment illustrated in FIGS. 5A and 5C, binary inputs of only one quality could be accommodated since electrode layers having only vertically oriented linear electrodes have been depicted. However, if, as illustrated in FIG. 6, the input to a given layer of these electrodes is thought of as a group of "X" (or ordinate) elements of a Cartesian coordinate system, it will be apparent that a similar group of electrodes might be horizontally oriented to perfect a group of "Y" (or abcissa) elements of the same coordinate systems. Therefore by using this technique, dual axial treatment, for example, of a given number group may be achieved. Thus, in FIG. 6, there is depicted such a structure having a "y" (abcissa) first order input electrode layer 600, a first electroluminescent layer 602, an "X" (ordinate) first order input electrode layer 604, a first photoconductive layer 606, a second electroluminescent layer 608, a "Y" (abcissa) second order input electrode layer 610, a second photoconductive layer 612, a third electroluminescent layer 614, an "X" ordinate second order input electrode layer 616, a third photoconductive layer 618, a fourth electroluminescent layer 620, a "Y" (abcissa) third order input electrode layer 622, a fourth photoconductive layer 624, a fifth electroluminescent layer 626, and an "X" (ordinate) third order input electrode layer 628. Thus it will be seen that the structure of this embodiment is analogous to that illustrated in FIGS. 5A and 5C, except that while the latter could accommodate one input for each exponential order of input, the embodiment illustrated in FIG. 6 can accommodate two types or qualities of inputs for each exponential order. The effect of the additional type or quality of input in each order is to divide the output of the other input associated with it in the same order into distinguishable segments, thereby permitting only selected portions of the latter to be displayed. It will be apparent that such portions, also through use of this invention, can be made to be distinctively associated with the logic or value of such added input. Thus, the first order of input has two contributors, gates $Cy$ and $Cx$, each of which is capable of discriminating either of two states and, through energization of associated circuits $C^0y$ and $C^1y$, and $C^0x$ and $C^1x$ respectively, each will cause to be energized either of two sets of sequentially alternating linear electrodes in each of two arrays of electrodes 600, 604 which are oriented at 90° to each other. Similar relationships exist as to the remaining electrodes in the pile, with two electrode arrays for each order of input. It will be apparent that the effect of energizing circuits $C^0y$ and $C^0x$ for example, will be to cause generation of 16 square patches of light, in 4 rows of 4 each in checkerboard configuration, with one in the lower lefthand corner looking from right to left. Energization of circuit $B^0y$ will cause only the 1st and 3rd lines from the bottom (or a total of ½ of 16, or 8 squares) to be regenerated. Energization of circuit $B^0x$ will cause only the 1st and 3rd squares from the left in each such line (or a total of ½ of 8, or 4 squares) to be regenerated. If circuit $A^0y$ is energized, only those squares (the 1st and 3rd from the left) already appearing in the bottom-most row (or ½ of 4, or 2 squares) will appear. Energization of $A^0X$ will cause only the 1st, or lefthand most square (½ of 2, or 1 square) to be regenerated. If the state of one of the gates is changed, the output will relocate to a position which, in horizontal and vertical designation, will be distinctively associated with that combination only. Thus, the above example, except for $A^1X$ being energized instead of $A^0X$, will produce a square of light at the 5th position from the left in the bottom-most row. However, the same example, except for $A^1y$ being energized instead of $A^0y$, will produce a square of light at the lefthand-most position in the 5th row from the bottom. If both $A^1y$ and $A^1X$ are energized, the position of the output will be the 5th square from the left in the 5th row from the bottom.

The effect of this treatment, in terms of read out, will be to make the vertical position of a given response, as well as its horizontal position, an element of the value indicated; the final output being one (vertically selected) segment of the whole (vertically oriented) line which inputs of only one quality would otherwise produce.

It will be apparent that, through use of such techniques, any variety of qualities for a given order of input may be accommodated, such as rho-theta coordinates rather than X–Y. Any number of qualities for a given order of input may be accommodated, although for most applications the number of qualities will be limited to two, which will fully describe the locus of any point on a plane. It will also be apparent that in all multi-axial devices, the electrode arrays of the first quality (e.g. ordinate) need not be physically juxtaposed next in sequential order to the array of other quality (e.g. abcissa) for the same order of input, since the effect of the matter is to selectively transmit discrete segments of only those outputs which are finally visible as read-outs, regardless of the degree to which such output is defined at the time when vertical segments of it are selected out.

Such inputs of additional quality may, of course, be made to have the same attributes previously cited as features of the primary ordinates, such as step motion, analog read-outs of digital inputs, etc. Therefore, it will be apparent to one skilled in the art that the ability of multi-ordinate devices made in accordance with this invention to accommodate any power of any number base in step-motion sequence along more than one axis, and to permit analog interpretation of digital inputs, makes its possible to make analog analyses of vectorially added digital inputs without the necessity of separate digital-to-analog convertors as circuit elements, and with circuitry which is structuarlly and electrically simple compared with that heretofore used.

FIG. 7 illustrates another embodiment of this invention which is a structural variant of the embodiment shown in FIGS. 5A and 5C to illustrate other of the various ways in which this invention may be practiced. It has the advantage of being somewhat simpler in structure. Like the embodiment shown in FIG. 5A, the embodiment shown in FIG. 7 has electrode layers 700, 706, 714, and 722, electroluminescent layers 704, 720, non-linearly resistive layers 702, 718, and a photoconductive layer 716. Unlike the embodiment shown in FIG. 5A, however, that shown in FIG. 7 does not have layers of photoconductive, electroluminescent, and non-linearly resistive material between the 2nd and 3rd electrode layers in the pile but has, instead, substrates 708, 712 which are light transmissive sheets of dielectric material such as glass or plastic, on either side of a continuous electrode layer 710 which is merely connected to ground. The function of these three layers is to isolate electrically the electrode layers 706, 714 from each other and to negate any capacitive effect of one of those electrode layers on the other through the operation of the grounded shielding electrode 710. Thus, an electroluminescent phosphor, together with photoconductive and non-linearly resistive layers optionally, are positioned between only each pair of electrode planes, rather than having successive electrode and electroluminescent planes as shown in FIG. 4. It will be seen that the effect of this structural variant will be to achieve the same outputs as with the embodiment shown in FIG. 5A with functionally simpler constituent layers, as noted above. It will also be noted that such results can be most advantageously achieved using this variant when an even number of electrode layers are present. However, an odd number of electrode layers could, of course, be accommodated by the embodiment shown in FIG. 5A, or by an embodiment combining the structures of the type illustrated in FIG. 5A with ones of the type illustrated in FIG. 7.

FIG. 8 illustrates yet another embodiment of this invention, demonstrating how its principles may be utilized to produce a gating matrix decoder device. For purposes of simplicity, a structure similar to that previously illustrated in FIG. 5A is shown, with electrode layers 800, 806, 814 and 822, photoconductive layers 808 and 816, electroluminescent layers 804, 812 and 820, and non-linearly resistive layers 802, 810 and 818. In this embodiment, however, every other electrode in each layer is electrically connected to one of the outputs of a bipolar gate capable if discriminating a "go" or "no-go" state of a given set of conditions. Thus, electrodes $A^0$ and $A^1$ respond respectively to the "go" and "no-go" discrimination of gate A; $B^0$ and $B^1$ to that of gate B; $C^0$ and $C^1$ to that of gate C; etc. It will again be apparent that a given output will be distinctly associated with only one combination of states of the gates in the matrix. For example, assume gate D is in a "go" state causing electrodes $D^1$ to be energized, gate C is in a "go" state causing electrodes $C^1$ to be energized, gate B is in a "go" state causing electrodes $B^1$ to be energized, and gate A is in a "go" state, causing the electrode $A^1$ to be energized. By operation of the phenomena heretofore explained, light will be sequentially reproduced at only one distinctive location through the viewing electrode 822 in response to this particular set of inputs, and a change in state of any of the gates will produce a corresponding shift in output to a location peculiar to the combination of gate states as it then is. Therefore, by this technique, an output will always be displayed and from it, an exact determination may be made of the state of all of the gates at that instant. It will also be obvious that similar determinations may be made for any number of matrix gates, including gates or gate sets exhibiting states in excess of 2 each, merely by relating the number of electrodes comprising each group in each electrode layer to the number of states which its associated gate set is capable of displaying and the number of electrode layers to the number of gate sets in the matrix.

Structures utilizing the principles of this invention, such as those embodiments heretofore discussed and illustrated, in addition to those features which have been described or are implicit in them, may be so constructed as to have memory characteristics, whereby display of previously read out information continues after the combination of inputs which has produced a given read out has been removed. This may be achieved through exploiting the fact that, typically, electroluminescent elements which are electrically in series with photoconductor elements and also optically coupled thereto, require less applied electrical potential to sustain luminescence in the "on" state than to initiate it from the "off" state, as by having a second or supplementary electrical potential source connected to the final read out electrode and the one next preceding it (e.g. layers 414 and 406 in FIG. 4, layers 514 and 520 in FIGS. 5A and 5C) which is of sufficient magnitude to sustain luminescence of associated electroluminescent layers after the photoconductive material goes to a low impedance state, but is lower in potential than the illumination threshold of that electroluminescent layer when the photoconductive material is in its high impedance state. Erasure of such memory may be achieved by interruption of one or both of the supplementary electrical supply circuits to the circuits.

Characteristically, non-linearly resistive material is somewhat opaque. In cases where such a non-linearly resistive layer is also incorporated into the final read out stage of a device, it may also be desirable to achieve memory, or retention of an output once it is achieved, by continuing the impingement of light on the photoconductive layer of the last stage by light "feeding back" through the non-linearly resistive layer from the electroluminescent layer positioned next to it in the same stage, so as to keep the inter-electrode impedance at a level sufficiently low so that a supplementary electrode supply for that stage may maintain the output in a lighted condition. To do so, light conductive paths, such as those well known in the field of "fiber optics," or by simply inserting transparent bodies into the structure, may be provided through portions of the non-linearly resistive layer corresponding in position to and coextensive with each primary input increment (e.g. the electrodes forming layer 400 in FIG. 4, or layer 500 in FIG. 5). By this means, electroluminescence in any incremental portion of the electroluminescent layer will be "fed back" to the photoconductive layer associated with it. The intra-electrode impedance at the point of display will be maintained within the sustaining capacity of the supplementary power supply, and the output will continue to be displayed.

It is also possible to construct memory characteristics into devices of the type heretofore described without the necessity for applying supplementary potentials to the last pair of electrode layers by merely appending to the output surface of the device a sandwich structure having memory as its sole function. Such a sandwich could comprise two layers of electrically discrete electrodes, each having a number of electrodes equal to the total primary input electrodes in the device being monitored, with an electroluminescent and a photoconductive layer positioned between them. A sustaining potential applied to all of the electrodes will cause the electroluminescent layer to glow if and only to the extent that, light impinges upon it as an input from the device being monitored. Such resulting outputs will be maintained until erased, and erasure may be effected by individual sequential interruption of the potential to one or both of the juxtaposed pairs of electrodes in the memory device.

Non-destructive interrogation of the memory function of the memory devices of any of the types heretofore described may be achieved through use of an added sandwich comprising two electrode layers, each having electrically discrete electrodes corresponding to the primary inputs of the device being monitored, each such layer being separated by a continuous layer of photoconductive material. In such a structure, light being propogated by the memory device will impinge upon the photoconductive layer affectively shorting out any pairs of electrodes bracketing the areas of impingement, thereby perfecting circuits associated with such electrodes, permitting detection by standard voltage or current sensing means.

It will also be apparent that a device of the type illustrated in FIG. 4 may be used to "read" output by utilizing such output as the primary light source, and "searching" for the location of the "read-out" by energizing subsequent electrode layers, combinations of which may be given discrete information retrieval meanings.

Since the configuration of the memory read out will be that of the cross section of such a conductive path, it is also possible, through use of the "fiber optic" technique, to use shape or configuration of read out as a means of distinguishing memorized or retained read-outs from transitory input read-outs.

It is to be understood that the embodiments which have been set forth herein are merely by way of illustration and not of limitation, and that numerous other embodiments in which this invention may be advantageously employed without departing from its spirit may be obvious to persons skilled in the art.

What is claimed is:

1. An electrical device comprising, in the order named,
a first light transmissive electrode,
a first mass of electroluminescent material,
a first mass of photoconductive material,
a first electrode member comprising more than one electrically discrete light transmissive electrodes,
a second mass of electroluminescent material, and
a second electrode member comprising more than one group of more than one electrically discrete electrodes each,
said first electrode, said first and second masses of electroluminescent material, said first and second electrode members, and said first mass of photoconductive material each having at least portions thereof which are substantially coextensive with at least portions of all of the others,
said coextensive portions of said first and second electrode members including at least a portion of all of said electrodes therein.

2. The device described in claim 1 wherein
said electrodes in each of said groups of electrodes in said second electrode member are arranged in the same relative sequence and electrodes in each of at least two groups and occupying the same sequential position in each of said two groups are electrically connected.

3. An electrical device comprising, in the order named,
a first layer comprising an electrode,
a second layer comprising electroluminescent material and which is contiguous to said first layer,
a third layer comprising at least two electrically discrete, light transmissive electrodes and which layer is contiguous to said second layer of electroluminescent material,
a fourth layer comprising photoconductive material and which is contiguous to said third layer,
a fifth layer comprising electroluminescent material and which is contiguous to said fourth layer, and
a sixth layer comprising at least two groups of at least two electrically discrete, light transmissive electrodes each and which layer is contiguous to said fifth layer,
both said groups of said electrodes in said sixth layer, and said electrodes in said third layer being substantially coextensive with said electrode in said first layer and at least a portion of said second, said fourth, and said fifth layers.

4. The device described in claim 3 wherein
said first, third, and sixth layers are planar and in parallel relationship to each other, the surfaces of each of said layers which adjoin another of said layers being contiguous throughout their coextensive portion.

5. An electrical device comprising
a first electrode member comprising at least two electrically discrete, light transmissive electrodes,
a first mass of electroluminescent material adjacent to said first electrode member, at least a portion of which is coextensive with at least a portion of each of two of said electrodes in said first electrode member,
a first mass of photoconductive material adjacent to said first mass of electroluminescent material,
a second electrode member adjacent to said first mass of photoconductive material, said second electrode member comprising two groups, each such group comprising two light transmissive electrodes which have at least a portion which is coextensive with said coextensive portions of said first electrode member and said first mass of electroluminescent material,
a second mass of electroluminescent material adjacent to said second electrode member, and
a third electrode member adjacent to said second mass of electroluminescent material, said third electrode member comprising two groupings of at least two groups each, each such group comprising two electrodes, at least a portion of said electrodes in said third electrode layer being coextensive with said coextensive portions of said first electrode member and said first mass of electroluminescent material, each of said groupings in said third electrode layer lying within limits which are coextensive with a different one of said groups in said second electrode member,
at least a portion of said first mass of photoconductive material and said second mass of electroluminescent material being coextensive with said coextensive portions of said first electrode member and said first mass of electroluminescent material.

6. The device described in claim 5 wherein
each of said electrodes in each of said groups in said second electrode member is electrically connected to at least one of said electrodes in another of said groups of electrodes in said second electrode, and
each of said electrodes in each of said groups in said third electrode member is electrically connected to at least one of said electrodes in each of the other of said groups in said third electrode member.

7. An electrical device comprising
a first electrode member comprising at least two electrically discrete, light transmissive electrodes,
a first mass of electroluminescent material adjacent to said first electrode member, at least a portion of which is coextensive with at least a portion of each of two of said electrodes in said first electrode member,
a first mass of photoconductive material adjacent to said first mass of electroluminescent material,
a second electrode member adjacent to said first mass of photoconductive material, said second electrode member comprising two groups, each such group comprising two light transmissive electrodes which have at least a portion which is coextensive with said coextensive portions of said first electrode member and said first mass of electroluminescent material, a second mass of electroluminescent material adjacent to said second electrode member, a third electrode member adjacent to said second mass of electroluminescent material, said third electrode member comprising two groupings of at least two groups each, each such group comprising two electrodes, at least a portion of said electrodes in said third electrode layer being coextensive with said coextensive portions of said first electrode member and said first mass of electroluminescent material, each of said groupings in said third electrode layer lying within limits which are coextensive with a different one of said groups in said second electrode member, and first means for supplying electrical energy to said electrodes comprising said second and said third electrode members across said second mass of electroluminescent material in an amount sufficient to cause it to emit light, and second means for supplying electrical energy to said electrodes comprising said first and said second electrode members across said first mass of electroluminescent material and said first mass of photoconductive material positioned therebetween, the energy so supplied by said second means being sufficient in amount to cause said first mass of electroluminescent material to begin to emit light only if light emitted by said second mass of electroluminescent material impinges upon said first mass of photoconductive material, at least a portion of said first mass of photoconductive material and said second mass of electroluminescent material being coextensive with said coextensive portions of said first electrode member and said first mass of electroluminescent material, each of said electrodes in each of said groups in said second electrode member being electrically connected to at least one electrode in another of said groups of electrodes in said second electrode member, each of said electrodes in each of said groups in said third electrode member being electrically connected to at least one electrode in each of the other of said groups in said third electrode member.

8. The device described in claim 7 including sustaining means for causing said first mass of electroluminescent material to continue to emit light so long as desired after said first and said second electrical means have ceased supplying electrical energy to said electrodes in an amount sufficient to cause said mass of electroluminescent material to continue to emit light.

9. The device described in claim 8 wherein said sustaining means comprise supplementary means for supplying electrical energy to said electrodes of said first, second and third electrode members whereby the masses of electroluminescent material positioned therebetween are caused to continue to emit light if, but only if, they have been caused to start emitting light by the electrodes comprising said second and said third electrode members having been electrically energized.

10. The device described in claim 7 including monitoring means for detecting when said electrical device is emitting light and the location along said first electrode member at which such light is being emitted.

11. The device described in claim 10 wherein said monitoring means comprises, in the order named, a fourth light transmissive electrode member positioned adjacent to and coextensive with said first electrode member on the opposite side thereof from said first mass of electroluminescent material, a second mass of photoconductive material adjacent to and coextensive with said fourth electrode member, a fifth electrode member adjacent to and coextensive with said second mass of photoconductive material, said fourth and fifth electrode members each comprising electrodes equal in number to and coextensive with said electrodes in said third electrode member, and means for detecting reductions in inter-electrode impedance between each of said electrodes in said fourth electrode member and the electrode in said fifth electrode member with which it is paired, which reductions are caused by light being emitted by said first mass of electroluminescent material impinging upon said second mass of photoconductive material.

12. An electrical device comprising, where N is some base number, X is some exponent, K is some coefficient, and Y is the total number of electrode members in the device, Y number of electrode members, the first of said electrode members having $KN^x$ number of electrically discrete electrodes and each sequentially next electrode member having electrically discrete electrodes which, in number, adhere to the following number series; $KN^{x+1}$, $KN^{x+2}$, $KN^{x+3}$ . . . $KN^{x+1(Y-1)}$, each electrode in each such member being substantially coextensive with a different group of KN number of electrodes in the electrode member next following in sequence to its own, at least all of said electrodes except those in the last member in sequence being light transmissive.

electroluminescent material positioned between each of said electrodes of each such member and said electrodes of the member sequentially next to its own member which are coextensive with it, and photoconductive material positioned between each of said electrodes of each such member and said electrodes of the member sequentially next to its own member which are coextensive with it except between the last and next to last members in the sequence.

13. The device described in claim 12 wherein each electrode in at least every electrode member other than the first in sequence is electrically connected to one electrode in each group of KN number of electrodes in the same electrode member other than the group of KN number of electrodes of which it forms a part.

14. An electrical device comprising, in the order named, where N is some base number, and X is an exponent thereof, a first member having $N^x$ number of electrically discrete electrodes, a second member comprising electroluminescent material, a third member comprising photoconductive material, a fourth member comprising $N^x$ number of groups of $N^x$ number of electrically discrete electrodes each, each such group being substantially coextensive with a different one of said first member electrodes, a fifth member comprising light transmissive dielectric material, a sixth member comprising light transmissive electrically conductive material, a seventh member comprising light transmissive dielectric material, an eighth member comprising $N^{x+1}$ number of groups of $N^x$ number of electrically discrete electrodes each, each such group being substantially coextensive with a different one of said electrodes in said fourth member, a ninth member comprising electroluminescent material, and a tenth member comprising $N^{x+2}$ groups of $N^x$ number of electricaly discrete electrodes each, each such group being substantially coextensive with a different one of said electrodes in said ninth member, said electrodes comprising said first, fourth and eighth members being light transmissive, said second, third, fifth, sixth, seventh and ninth members being substantially coextensive with said electrodes in said first, fourth, eighth, and tenth members, at least to the extent that said electrodes in each electrode member are coextensive with said electrodes in the other of said electrode members.

15. The device described in Claim 14 wherein each of said electrodes in each group of $N^x$ number of electrodes in each of said members is electrically interconnected to one of said electrodes in every other group of $N^x$ number of electrodes in the same of said members.

16. An electrical device comprising, in the order named, where N is some base number and X is some exponent thereof, a first array of $N^x$ number of elongated electrically discrete, light transmissive electrodes arrayed with the long axes of all of them parallel to each other, in parallel planar juxtaposition to said first array, a second array of $N^x$ number of elongated electrically discrete, light transmissive electrodes arrayed with the long axes of all of them parallel to each other and at an angle of orientation with respect to the long axes of said electrodes in said first array of other than 0°, in parallel planar juxtaposition to said second array, a third array of $N^x$ number of groups of $N^x$ number of elongated electrically discrete, light transmissive electrodes each, said electrodes being arrayed with the long axes of all of them parallel to each other and to the long axes of said electrodes in said first array, each group of $N^x$ number of electrodes in said third array being substantially coextensive with a different one of said electrodes in said first array, in parallel planar juxtaposition to said third array, a fourth array of $N^x$ number of groups of $N^x$ numbers of elongated electrically discrete, light transmissive electrodes each, said electrodes being arrayed with the long axes of all of them parallel to each other and to the long axes of said electrodes in said second array, each group of $N^x$ number of electrodes in said fourth array being substantially coextensive with a different one of said electrodes in said second array, in parallel juxtaposition to said fourth array, a fifth array of $N^{x+1}$ number of groups of $N^x$ number of elongated electrically discrete, light transmissive electrodes each, said electrodes being arrayed with the long axes of all of them parallel to each other and to the long axes of said electrodes in said third and said first arrays, each group of $N^x$ number of electrodes in said fifth array being substantially coextensive with a different one of said electrodes in said third array, in parallel juxtaposition to said fifth array, a sixth array of $N^{x+1}$ number of groups of $N^x$ number of elongated electrically discrete electrodes each, said electrodes being arrayed with the long axes of all of them parallel to each other and to the long axes of said electrodes in said second and said fourth arrays, each group of $N^x$ number of electrodes in said sixth array being substantially coextensive with a different one of said electrodes in said second array, electroluminescent material positioned between each adjacent pair of said arrays contiguously and coextensively therewith, and photoconductive material positioned between each adjacent pair of said arrays other than between the fifth and sixth arrays, contiguously and coextensively therewith.

17. The device claimed in claim 16 wherein the shape of all of said electrodes is rectangular.

18. The device claimed in claim 16 wherein the angle of orientation of the long axes of said electrodes comprising said first, third, and fifth arrays with respect to said electrodes comprising the said second, fourth, and sixth arrays is 90°.

19. The device described in claim 16 wherein each of said electrodes in each group of $N^x$ number of electrodes in each array is electrically interconnected with that electrode in each of the other of said groups in the same array that occupies the same sequential position with respect to the remaining electrodes in the said groups.

20. An electrical device comprising, in a multilayer structure of superposed layers at least two electrode arrays of at least two elongated, electrically discrete electrodes each with the long axes of said electrodes in each respective array parallel to each other, at least two other electrode arrays with each of said other electrode arrays comprising at least two groups of electrodes with each group comprising at least two elongated, electrically discrete electrodes arranged in parallel relationship to each other and to all other electrodes in the respective electrode array, each of said groups of electrodes adapted to be substantially coextensive with one of said electrodes in one of said first-named electrode arrays, each of said electrode arrays juxtaposed to at least one other of said electrode arrays with two of said electrode arrays being end electrode arrays and all other electrode arrays positioned intermediate thereof with one of said end electrode arrays forming a display face, each one of said first-named electrode arrays being arranged with the long axes of the electrodes thereof parallel to the long axes of the electrodes of a respective one of said second-named electrode arrays with the long axes of the electrodes of one pair of electrode arrays comprising a parallel disposed first-named electrode array and a second-named electrode array being at an angle of orientation other than 0° with respect to the long axes of the electrodes of another pair of electrode arrays comprising a parallel disposed first-named electrode array and a second-named electrode array, and at least said electrodes in said electrode array forming said display face and each of said intermediately positioned electrode arrays being light-transmissive, electroluminescent material positioned between each adjacent pair of said electrode arrays contiguously and coextensively therewith, and photoconductive material positioned at least between each adjacent pair of said electrode arrays other than that pair which includes said end electrode array not forming a display face, contiguously and coextensively therewith.

No references cited.

JAMES W. LAWRENCE, *Primary Examiner.*

R. JUDD, *Assistant Examiner.*